United States Patent
Borg et al.

(10) Patent No.: US 10,092,867 B2
(45) Date of Patent: Oct. 9, 2018

(54) AUTOMATIC SWIMMING POOL CLEANER CONCEPTS

(71) Applicant: ZODIAC POOL SYSTEMS, INC., Vista, CA (US)

(72) Inventors: Dustin Borg, Poway, CA (US); Hendrikus Johannes van der Meijden, Glen Austin (ZA)

(73) Assignee: ZODIAC POOL SYSTEMS LLC, Vista, CA (US)

( * ) Notice: Subject to any disclaimer, the term of this patent is extended or adjusted under 35 U.S.C. 154(b) by 0 days.

(21) Appl. No.: 14/816,362

(22) Filed: Aug. 3, 2015

(65) Prior Publication Data
US 2016/0040445 A1 Feb. 11, 2016

Related U.S. Application Data

(60) Provisional application No. 62/033,785, filed on Aug. 6, 2014.

(51) Int. Cl.
*E04H 4/16* (2006.01)
*B01D 35/28* (2006.01)

(52) U.S. Cl.
CPC ........... *B01D 35/28* (2013.01); *E04H 4/1654* (2013.01)

(58) Field of Classification Search
CPC .............................. B01D 35/28; E04H 4/1654
USPC ........................ 210/167.16, 167.17; 15/1.7
See application file for complete search history.

(56) References Cited

U.S. PATENT DOCUMENTS

| | | | |
|---|---|---|---|
| 3,078,998 A | 2/1963 | Blumenfeld | |
| 3,287,755 A | 11/1966 | Pansini | |
| 3,707,737 A * | 1/1973 | Brower | E04H 4/1618 114/222 |
| 4,768,532 A | 9/1988 | Johnson | |
| 5,336,403 A * | 8/1994 | Marbach | E04H 4/1618 15/1.7 |
| 6,409,916 B1 | 6/2002 | Zelas et al. | |
| 6,601,255 B1 | 8/2003 | Van Der Meyden et al. | |
| 2002/0129839 A1* | 9/2002 | Erlich | E04H 4/1654 134/22.18 |

(Continued)

OTHER PUBLICATIONS

Definition of "adjacent," www.merriam-webster.com/dictionary/adjacent, retrieved on Apr. 30, 2018, one page.*

(Continued)

*Primary Examiner* — Fred Prince
(74) *Attorney, Agent, or Firm* — Kilpatrick Townsend & Stockton LLP; Dean W. Russell

(57) ABSTRACT

Described are cleaning devices intended for immersion in water of swimming pools and spas. The devices beneficially may be pressure-side cleaners attached indirectly to outlets of water-circulation pumps. The supply of pressurized water travelling from a pump to such a device may be employed for various purposes, including directing debris-laden water to or near tops of debris collection chambers. The water exiting nozzles associated with the devices may push, rather than pull, the debris-laden water toward the collection chambers. Some nozzles may be oriented approximately parallel to a to-be-cleaned pool surface, and curved tubes may be employed to direct water and debris flow to perimeters of the cleaners.

7 Claims, 5 Drawing Sheets

(56) References Cited

U.S. PATENT DOCUMENTS

| | | | | |
|---|---|---|---|---|
| 2008/0236628 A1* | 10/2008 | Horvath | ............... | E04H 4/1654 |
| | | | | 134/21 |
| 2010/0011521 A1* | 1/2010 | Collins | ................ | E04H 4/1654 |
| | | | | 15/1.7 |
| 2012/0074050 A1* | 3/2012 | Rief | ...................... | E04H 4/1209 |
| | | | | 210/167.16 |
| 2013/0081216 A1* | 4/2013 | Gopalan | ............... | E04H 4/1654 |
| | | | | 15/1.7 |
| 2013/0081986 A1 | 4/2013 | Gopalan et al. | | |

OTHER PUBLICATIONS

Australian Innovation Patent Application No. AU2015101063, Second Examination Report, dated Mar. 4, 2016, 6 pages.
Australian Patent Application No. 2015101063; Examination Report No. 1, dated Oct. 23, 2015, 5 pages.

* cited by examiner

AUTOMATIC SWIMMING POOL CLEANER CONCEPTS

CROSS-REFERENCE TO RELATED APPLICATION

This application claims the benefit of and priority to U.S. Provisional Patent Application Ser. No. 62/033,785, filed Aug. 6, 2014, and having the same title as appears above, the entire contents of which application are incorporated herein by this reference.

FIELD OF THE INVENTION

This invention relates to components, aspects, and characteristics of automatic cleaners of swimming pools or spas (typically referred to as "automatic pool cleaners" or "APCs") and more particularly, although not necessarily exclusively, to features of types of APCs configured to connect indirectly to, and receive pressurized water from, outlets of water-circulation pumps (typically referred to as "pressure-side" APCs).

BACKGROUND OF THE INVENTION

Many conventional pressure-side APCs utilize a flow of pressurized water to draw debris into a collection container. This result occurs because of the Venturi principle, as the pressurized water flow creates a low-pressure region drawing ambient, debris-laden pool water into a body of the cleaner. The debris-laden water usually passes through an opening in the bottom of the body and eventually through an opening in the bottom of a fluid-permeable bag (or other filter). Most solid debris remains in the bag while its carrying water exits because of the fluid-permeable nature of the bag. However, when the flow of pressurized water ceases, debris within the bag is susceptible to falling out of the bottom opening under influence of gravity.

Some jet nozzles through which pressurized water flows in these conventional cleaners usually are located inside a vacuum tube between the inlet thereof and the bag. Positioning the nozzles in this way facilitates drawing the debris-laden water into the tube. However, this positioning also increases risk of debris clogging the inlet to the vacuum tube, an undesirable result. Locating the jet nozzles within the vacuum tube additionally moves the low-pressure zone of the Venturi effect away from the to-be-cleaned surface of the pool, reducing effectiveness of the APC at drawing in debris and diminishing the suction force available to facilitate locomotion and climbing of the APC within the pool.

Furthermore, these jet nozzles typically aim the water flow through the center of the cleaner in a (mostly linear) direction perpendicular to the to-be-cleaned surface. Centrally locating the jet nozzles and vacuum tube, however, necessitates locating other components—including but not limited to the drive system, manifolds, and collection chamber(s)—at the perimeter of the APC. While this APC component lay-out is generally satisfactory, it is not always efficient.

Commonly-owned U.S. Pat. No. 6,601,255 to van der Meyden, et al., whose entire contents are incorporated herein by this reference, details another exemplary pressure-side APC. An illustrated version of the APC "is generally spheroidal in shape" and includes a central zone bounded by two rotatable segments. See van der Meyden, col. 6, ll. 35-38. Alternatively, the rotatable segments may be cylindrically shaped or resemble truncated cones. See id., col. 7, ll. 10-13.

As noted in the van der Meyden patent, debris-laden water may be ingested at the mouth of a curved suction (vacuum) passage and passed thereafter into a debris collector. Consistent with other pressure-side cleaners, those of the van der Meyden patent position jet nozzles within the curved suction passage. See id., col. 8, l. 45 to col. 9, l. 4. Also like other pressure-side APCs, those of the van der Meyden patent locate the suction passages in the central zones of the cleaners.

SUMMARY OF THE INVENTION

The present invention provides alternative designs for APCs. In particular, these designs may direct debris-laden water to collection chambers other than through openings at the bottoms of the chambers. Directing debris to (or near) tops of collection chambers materially reduces the likelihood that debris will fall out of the chambers when flow of pressurized water ceases, as no bottom openings are needed.

Cleaners configured in accordance with the invention also may position jet nozzles outside, rather than within, vacuum tubes. This repositioning allows the pressurized water exiting the nozzles to push, rather than draw, debris-laden water into the tubes. By using high-energy water to push the debris-laden water in this manner, the risk of debris clogging the inlets of the tubes is substantially reduced.

The jet nozzles also may be oriented relative to a pool surface differently than in conventional cleaners. Aiming nozzles approximately parallel to the to-be-cleaned pool surface allows their placement adjacent to the surface. This adjacency of jet nozzles and pool surface may result in greater debris-collection capability and suction force for purposes of movement.

Finally, the innovative APCs may use curved vacuum tubes to direct water and debris flow to perimeters of the cleaners rather than through their central regions or zones. The central areas thus are available for placement of other components, unlike conventional designs. As noted above, repositioning these components may be more efficient in at least some cases.

It thus is an optional, non-exclusive object of the present invention to provide novel cleaning devices for fluid-containing vessels such as swimming pools and spas.

It is another optional, non-exclusive object of the present invention to provide APCs in which debris-laden water is directed to portions of collection chambers of the cleaners other than openings at the bottoms of the chambers.

It is also an optional, non-exclusive object of the present invention to provide cleaners in which jets of pressurized water may be used to push, rather than draw, debris-laden water into tubes for eventual settling in collection chambers.

It is a further optional, non-exclusive object of the present invention to provide APCs in which jet nozzles are placed adjacent a to-be-cleaned surface and water exiting the nozzles does so approximately parallel to the surface.

It is, moreover, an optional, non-exclusive object of the present invention to provide cleaners in which curved tubes may be used to direct water and debris flow to perimeters of the cleaners.

Other objects, features, and advantages of the present invention will be apparent to those skilled in the relevant art with reference to the remaining text and the drawings of this application.

DETAILED DESCRIPTION

Depicted in FIGS. 1-5 is exemplary APC 10. Cleaner 10 is designed especially, although not necessarily exclusively, for autonomously transiting surfaces of a swimming pool and collecting debris suspended in the water of the pool. It may, if desired, contain any of the components of conventional pool cleaners such as those illustrated or described in U.S. Pat. No. 6,665,900 to Wichmann, et al., whose entire contents are incorporated herein by this reference.

Figure 1:
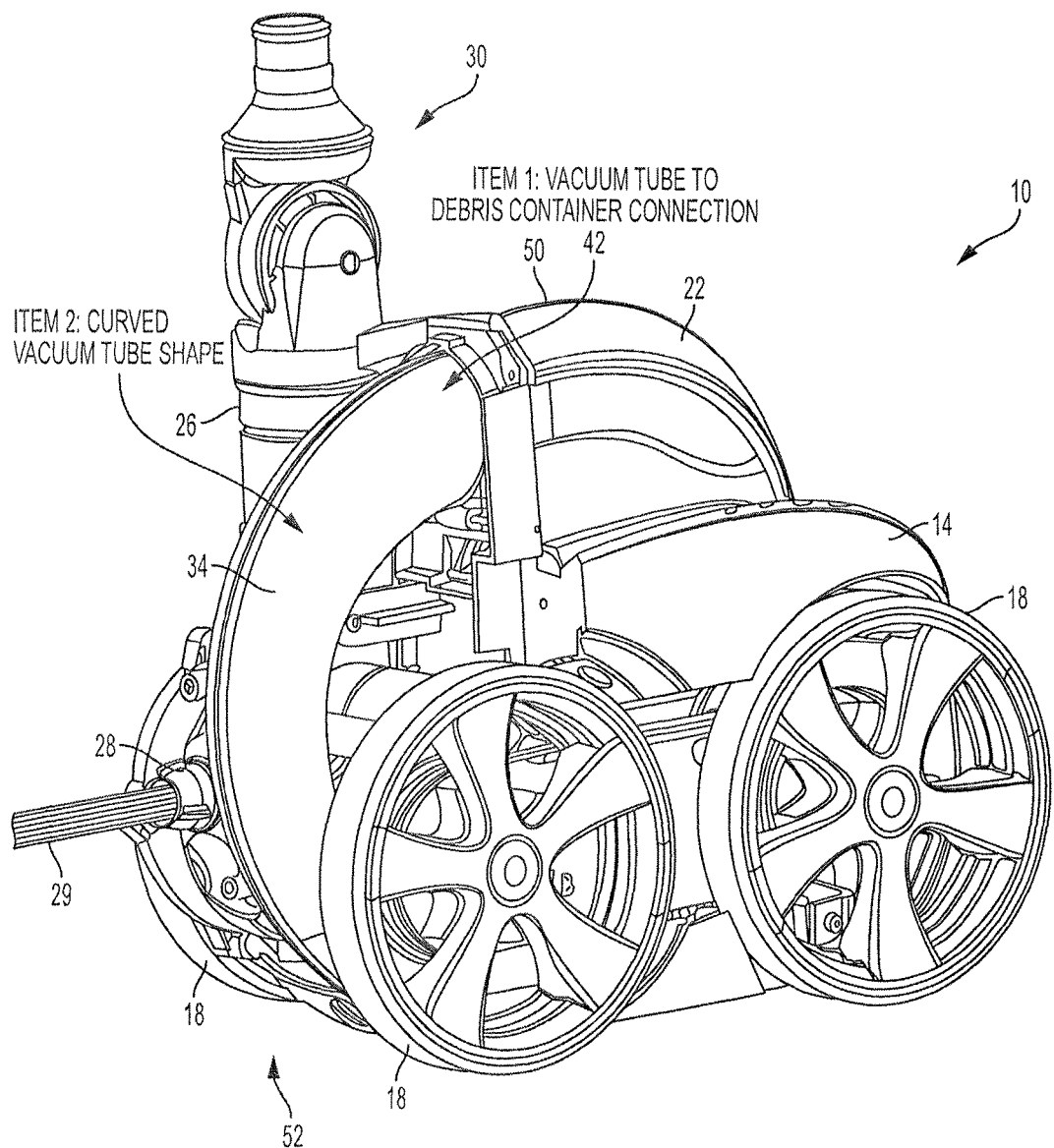
FIG. 1 is a perspective view of an exemplary cleaning device including features of the present invention.
Figure 2:
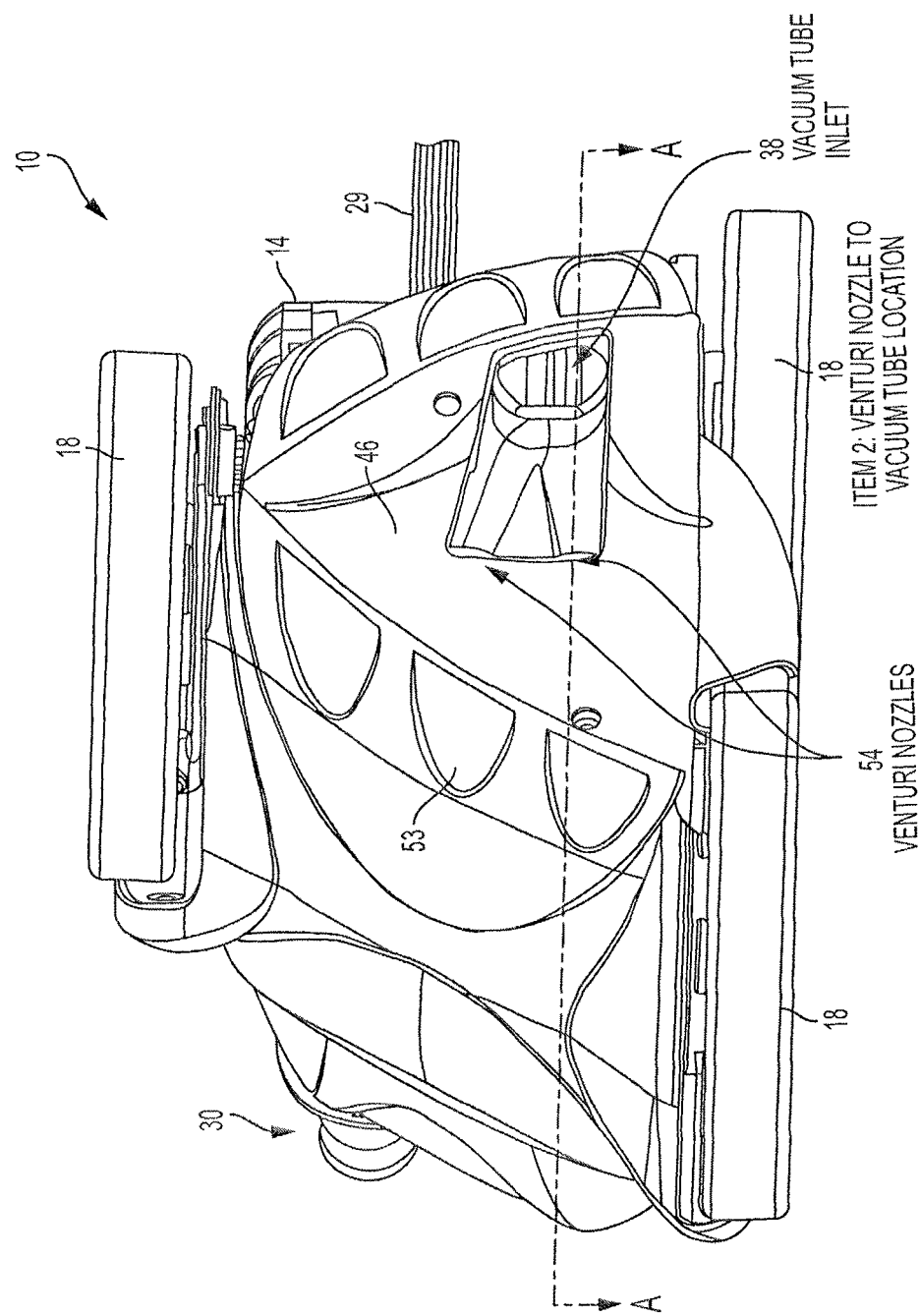
FIG. 2 is a bottom, generally plan view of the cleaning device of FIG. 1.
Figure 3:
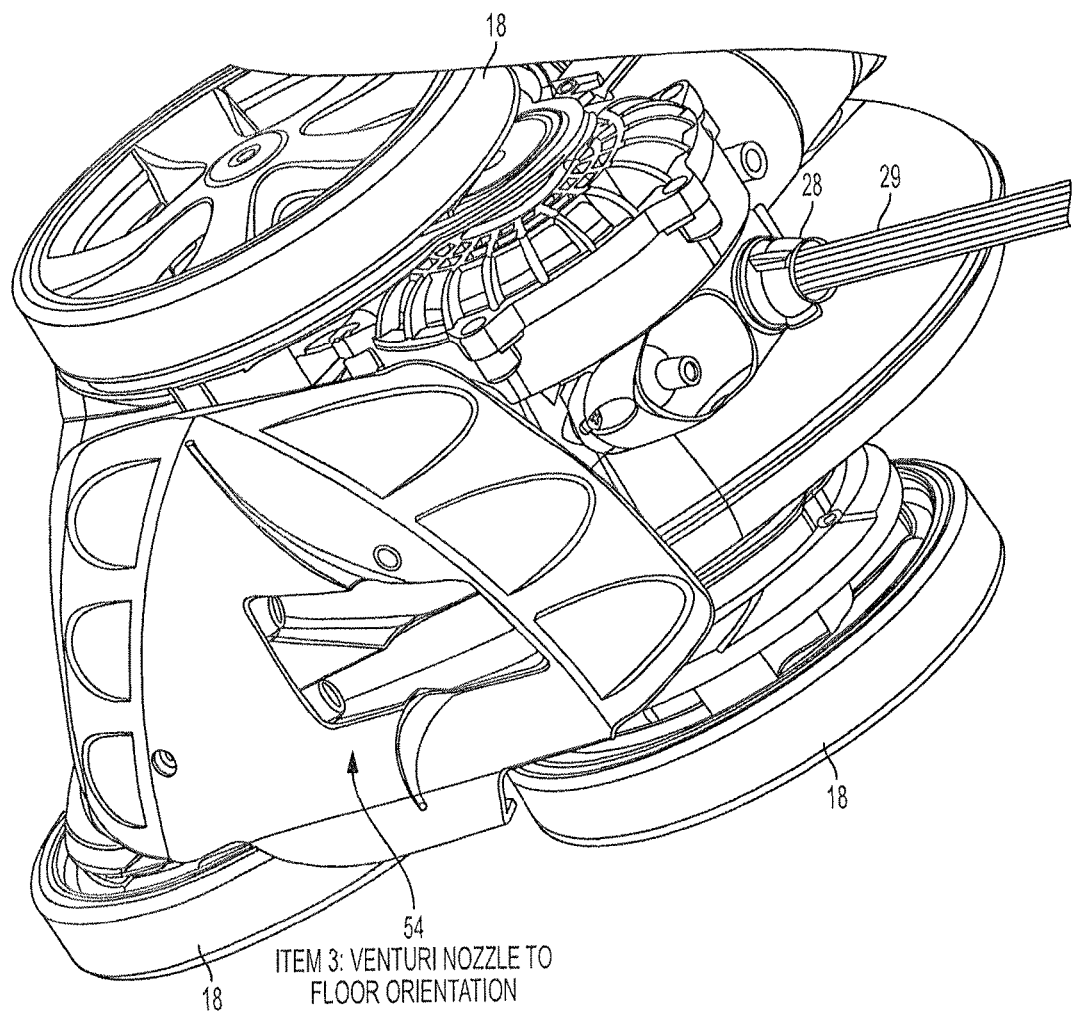
FIG. 3 is a perspective view of, principally, the bottom and rear of the cleaning device of FIG. 1.
Figure 4:
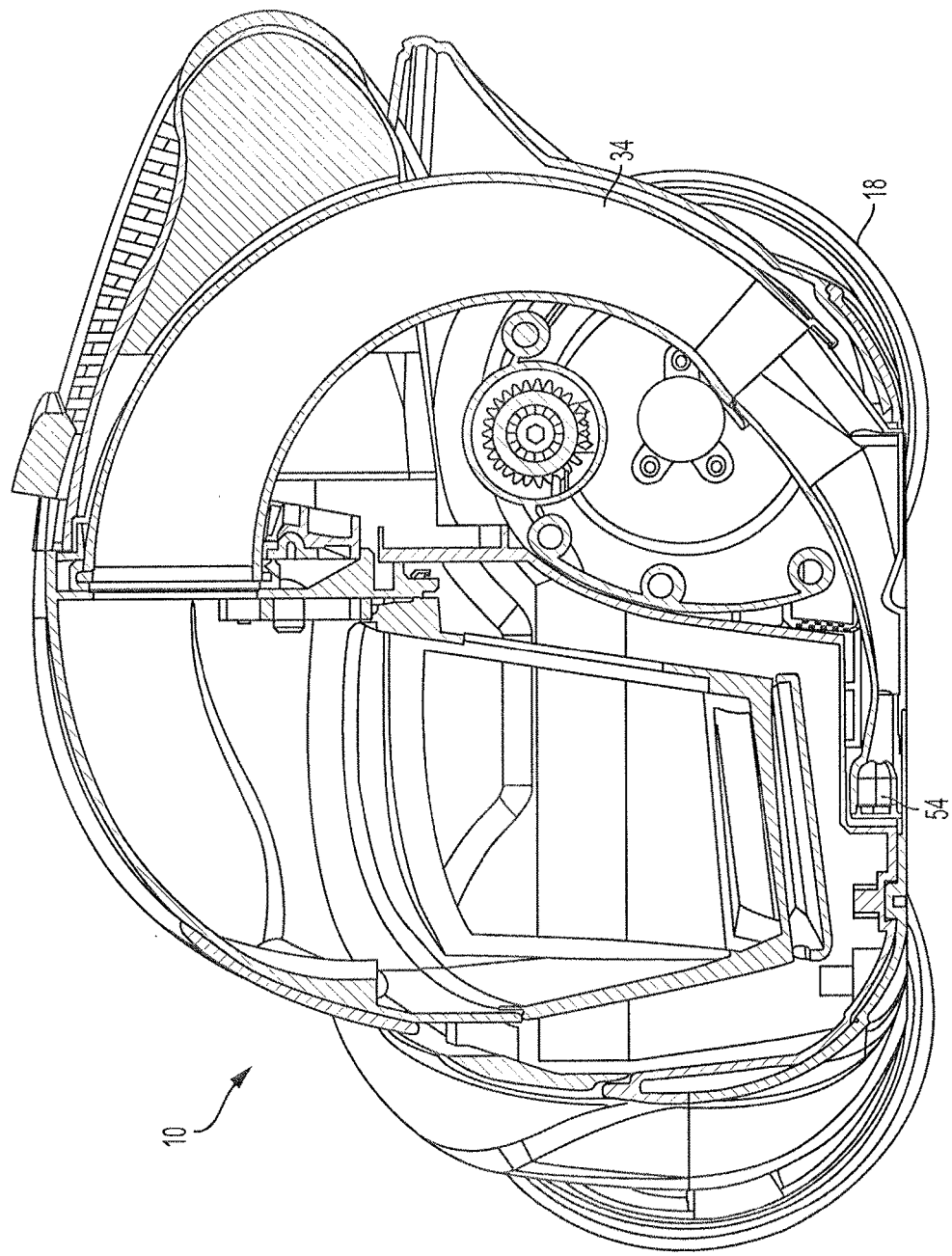
FIG. 4 is a cross-sectional view of the cleaning device of FIG. 1 taken along lines A-A of FIG. 2.
Figure 5:
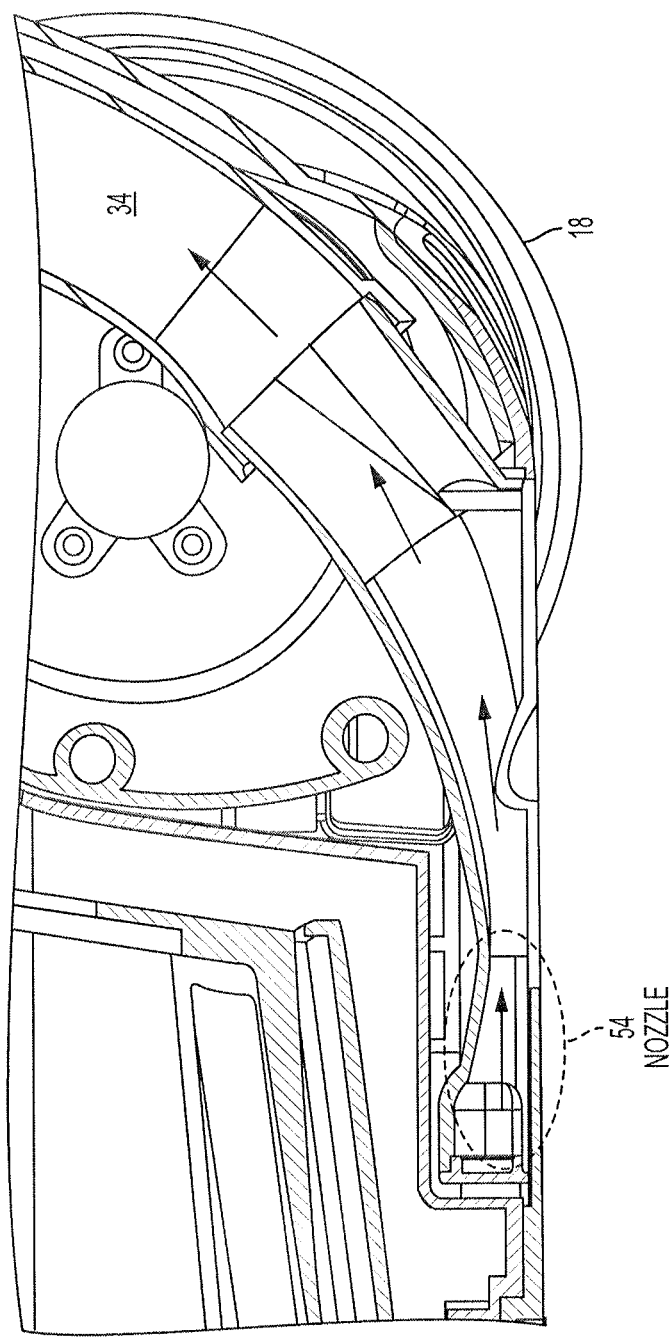
FIG. 5 is a close-up view of portions of the cleaning device shown in FIG. 4.

Preferably, however, cleaner 10 comprises a housing or body 14 and a drive system including wheels 18. Three such wheels 18 asymmetrically positioned about body 14 are shown in FIGS. 1-3, although more or fewer wheels 18 may be utilized instead. Similarly, wheels 18 need not be asymmetrically positioned about body 14, especially if an even number of wheels 18 are employed. Tracks or other drive mechanisms also may be used in lieu of, or in addition to, wheels 18.

Collection chamber 22 additionally may form part of cleaner 10, as may supply mast 26 and fitting 28. Mast 26 is configured to attach to a flexible hose for fluid communication with an outlet of a pump; it thus receives pressurized fluid from the pump. The pressurized fluid so received may be utilized for either or both of debris-collection (employing the Venturi effect) and motive purposes. FIG. 1 illustrates mast 26 terminating in (optional) swivel joint 30 to reduce tangling of, and steering effects caused by, the flexible hose to which it is attached in use. Fitting 28 may be configured for attachment to sweep tail hose 29 to facilitate suspension of debris in the pool water.

Shown also in FIG. 1 is vacuum tube 34. Tube 34 may define inlet 38 (see FIG. 2) and outlet 42. Inlet 38 preferably is positioned in, at, or near bottom surface or area 46 of body 14 so as to be adjacent the to-be-cleaned surface supporting cleaner 10. Outlet 42, by contrast, preferably communicates with collection chamber 22, so that debris-laden water ingested in inlet 38 may travel through tube 34 to chamber 22 for retention of debris therein.

As illustrated in FIG. 1, tube 34 advantageously may be curved. Doing so facilitates connection of its outlet 42 to upper portion 50 of collection chamber 22, unlike in conventional pressure-side APCs. Outlet 42 need not necessarily feed into upper portion 50, but doing so reduces likelihood of debris falling out of a bottom of the chamber 22 when no pressurized water is available to supply mast 26 (as, for example, when the pump is disabled).

Moreover, tube 34 may be positioned, in whole or in part, at perimetral region 52—rather than in central region 53—of cleaner 10. As noted above, conventional vacuum tubes of pressure-side APCs extend centrally through cleaner bodies, with other components of the APCs being moved within the bodies so as to accommodate the tubes. This need not occur in connection with cleaner 10, however, as tube 34 need not extend centrally through body 14. Instead, some or all of tube 34 may extend outside (or at or to a side) of body 14, with most or all of the inside of body 14 remaining available for placement of other components of cleaner 10.

FIGS. 2-3 depict nozzles 54 in, at, or near bottom area 46. Two such nozzles 54 are illustrated in these drawings, although more or fewer nozzles 54 may be used as desired. Preferably, though, nozzles 54 are both positioned external to tube 34 and oriented parallel (or generally so) to the surface supporting wheels 18. By not positioning nozzles 54 within a vacuum tube, the low pressure region created by jetted water exiting nozzles 54 is moved closer to the to-be-cleaned pool surface, thus enhancing debris-collection capabilities and suction effects useful for maintaining traction of cleaner 10 on the pool surface. Orienting nozzles 54 so that their jetted exhaust is generally parallel to the pool surface also facilitates placement of the nozzles 54 adjacent the pool surface.

Placing nozzles 54 outside tube 34 also allows them to be oriented so that their jetted exhaust water pushes debris-laden water into inlet 38 of the tube 34 rather than drawing the debris-laden water into the inlet 38. This change reduces the likelihood of (larger) debris clogging inlet 38, as the exhaust energy of the jetted water normally would be sufficient to force the debris into and through tube 34. Such placement and orientation of a nozzle 54 are well illustrated in FIGS. 4-5, for example.

The foregoing is provided for purposes of illustrating, explaining, and describing embodiments of the present invention. Modifications and adaptations to these embodiments will be apparent to those skilled in the art and may be made without departing from the scope or spirit of the invention. References to "pool," "swimming pool," and the like made herein may include spas, hot tubs, and other man-made bodies of water used for swimming, recreation, or therapy.

What is claimed is:

1. An automatic swimming pool cleaner comprising:
   a. a body;
   b. means, comprising a plurality of wheels or tracks, for autonomously moving the body in a travel direction on a surface of a swimming pool;
   c. means for collecting debris suspended in water of the swimming pool, comprising:
      i. a tube defining an inlet region and an outlet;
      ii. a debris collection chamber having an upper portion to which the outlet of the tube is in fluid communication; and
      iii. at least one nozzle (A) configured to exhaust pressurized water, (B) positioned adjacent the inlet region of the tube, and (C) oriented so that in operation the pressurized water exhausts in (I) a direction generally parallel to both the travel direction and the surface of the swimming pool and (II) a manner pushing debris-laden water of the swimming pool toward or within the inlet region of the tube regardless of whether the body is moving on the surface of the swimming pool; and
   d. a supply mast configured to attach to a flexible hose for receiving pressurized water from a pump.

2. A swimming pool cleaner comprising:
   a. a body;
   b. means for moving the body on a surface of a swimming pool;
   c. means for collecting debris suspended in water of the swimming pool, comprising:
      i. a tube defining an inlet region and an outlet;
      ii. a debris collection chamber having an upper portion to which the outlet of the tube is in fluid communication; and iii. at least one nozzle (A) configured to exhaust pressurized water, (B) positioned adjacent the inlet region of the tube, and (C) oriented so that in operation the pressurized water exhausts in (I) a direction generally parallel to the surface of the swimming pool and (II) a manner pushing debris-laden water of the swimming pool toward or within the inlet region of the tube regardless of whether the body is moving on the surface of the swimming pool;

d. a supply mast (i) configured to attach to a flexible hose for receiving pressurized water from a pump and (ii) terminating in a swivel joint; and e. a sweep tail for facilitating suspension of debris in the water of the swimming pool.

3. A swimming pool cleaner according to claim 2 in which the means for moving the body comprises a plurality of wheels.

4. A swimming pool cleaner according to claim 3 in which (a) the body has a bottom area and (b) the inlet of the tube is positioned in, at, or near the bottom area.

5. An automatic swimming pool cleaner comprising:
a. a body;
b. means, comprising a plurality of wheels or tracks, for autonomously moving the body in a travel direction on a surface of a swimming pool; and
c. means for collecting debris suspended in water of the swimming pool, comprising:
  i. a curved tube defining an inlet region and an outlet;
  ii. a debris collection chamber having an upper portion to which the outlet of the curved tube is in fluid communication; and
  iii. at least one nozzle (A) configured to exhaust pressurized water, (B) positioned adjacent the inlet region of the curved tube, and (C) oriented so that in operation the pressurized water exhausts in (I) a direction generally parallel to both the travel direction and the surface of the swimming pool and (II) a manner pushing debris-laden water of the swimming pool toward or within the inlet region of the tube regardless of whether the body is moving on the surface of the swimming pool.

6. An automatic swimming pool cleaner according to claim 5 in which (a) the body has (i) a central region and (ii) a perimetral region and (b) at least a portion of the curved tube is positioned in the perimetral region of the body.

7. An automatic swimming pool cleaner according to claim 6 in which the at least one nozzle is positioned externally of the curved tube.

* * * * *